United States Patent
Lee et al.

(10) Patent No.: US 10,989,850 B2
(45) Date of Patent: Apr. 27, 2021

(54) OPTICAL FILM HAVING A LIQUID CRYSTAL LAYER INCLUDING TWISTED NEMATIC LIQUID CRYSTAL COMPOUNDS

(71) Applicant: LG CHEM, LTD., Seoul (KR)

(72) Inventors: Dae Hee Lee, Daejeon (KR); Jun Won Chang, Daejeon (KR); Young Jin Kim, Daejeon (KR); Moon Soo Park, Daejeon (KR); Sergey Belyaev, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/902,959

(22) PCT Filed: Sep. 29, 2014

(86) PCT No.: PCT/KR2014/009092
§ 371 (c)(1),
(2) Date: Jan. 5, 2016

(87) PCT Pub. No.: WO2015/046983
PCT Pub. Date: Apr. 2, 2015

(65) Prior Publication Data
US 2016/0187554 A1    Jun. 30, 2016

(30) Foreign Application Priority Data

Sep. 27, 2013 (KR) .................. 10-2013-0115216
Sep. 30, 2013 (KR) .................. 10-2013-0117044
Sep. 29, 2014 (KR) .................. 10-2014-0129888

(51) Int. Cl.
*G02B 5/30* (2006.01)
*G02F 1/139* (2006.01)
(Continued)

(52) U.S. Cl.
CPC ......... *G02B 5/3016* (2013.01); *G02B 5/3083* (2013.01); *G02F 1/1396* (2013.01);
(Continued)

(58) Field of Classification Search
CPC combination set(s) only.
See application file for complete search history.

(56) References Cited

U.S. PATENT DOCUMENTS 7,029,601 B2    4/2006  Faris
7,110,052 B1    9/2006  Fads et al.
(Continued)

FOREIGN PATENT DOCUMENTS

CN    101681062 A    3/2010
JP    08-321381 A    12/1996
(Continued)

*Primary Examiner* — Lauren Nguyen
(74) *Attorney, Agent, or Firm* — Dentons US LLP

(57) ABSTRACT

The present application relates to an optical film and a use thereof. In the present application, through control of an alignment state of a liquid crystal compound in a liquid crystal layer, the liquid crystal layer may exhibit so-called reverse-wavelength dispersion while forming a single thin layer. An optical film including the liquid crystal layer may show optical modulation in a display device such as a liquid crystal display (LCD), organic light emitting device (OLED), or the like, or may be used in various applications, for example, as an optical element capable of improving light utilization efficiency, an element for implementation of a stereoscopic image and quality improvement thereof, and so forth.

19 Claims, 5 Drawing Sheets

(51) Int. Cl.
  *G02F 1/1337* (2006.01)
  *G02F 1/13363* (2006.01)
(52) U.S. Cl.
  CPC ........ *G02F 1/1397* (2013.01); *G02F 1/13363* (2013.01); *G02F 1/133703* (2013.01); *G02F 1/133633* (2021.01); *G02F 1/133636* (2013.01); *G02F 2413/15* (2013.01)

(56) References Cited

U.S. PATENT DOCUMENTS

| | | | | |
|---|---|---|---|---|
| 2002/0167627 | A1* | 11/2002 | Umeya | G02B 5/3016 349/96 |
| 2009/0122237 | A1 | 5/2009 | Fukagawa et al. | |
| 2009/0161045 | A1* | 6/2009 | Kawamoto | G02B 5/3033 349/98 |
| 2010/0157204 | A1* | 6/2010 | Ichihashi | G02B 5/3016 349/75 |
| 2012/0224126 | A1* | 9/2012 | Chang | G02B 5/3016 349/117 |
| 2012/0236235 | A1* | 9/2012 | Ishiguro | G02B 5/3033 349/96 |

FOREIGN PATENT DOCUMENTS

| | | |
|---|---|---|
| JP | 2000-509519 A | 7/2000 |
| JP | 2001-509520 A | 7/2001 |
| JP | 2002-286935 A | 10/2002 |
| JP | 2003-215341 A | 7/2003 |
| JP | 2007-147846 A | 6/2007 |
| JP | 2008-309957 A | 12/2008 |
| JP | 2009-265130 A | 11/2009 |
| KR | 10-2009-0010086 A | 1/2009 |
| KR | 10-2012-0050397 A | 5/2012 |
| KR | 10-2012-0055129 A | 5/2012 |
| KR | 10-1251248 A | 5/2012 |
| KR | 10-2012-0120083 A | 11/2012 |
| KR | 10-1251248 B1 | 4/2013 |

\* cited by examiner

Fig. 1 < Prior Art >
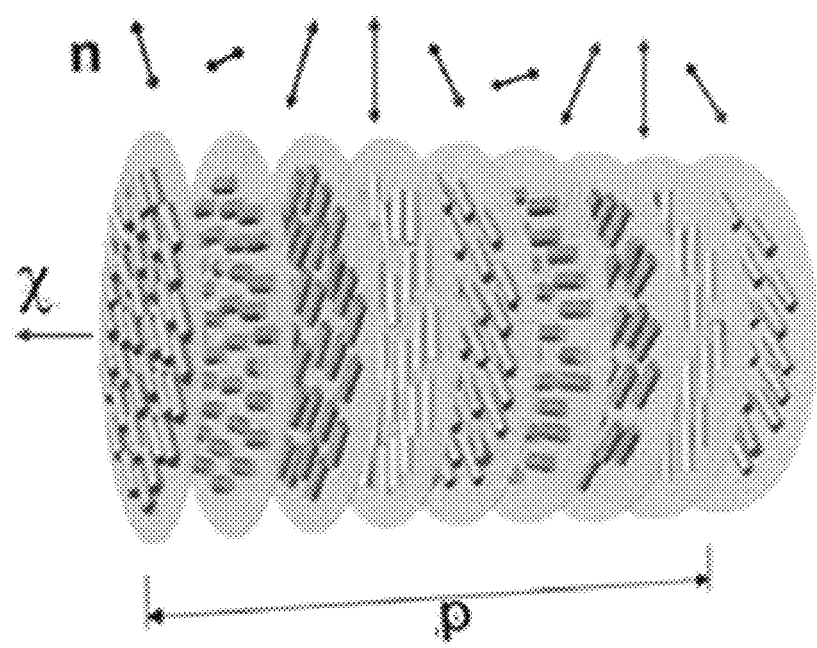

OPTICAL FILM HAVING A LIQUID CRYSTAL LAYER INCLUDING TWISTED NEMATIC LIQUID CRYSTAL COMPOUNDS

This application is a National Stage Entry of International Application No. PCT/KR2014/009092, filed Sep. 29, 2014, and claims the benefit of and priority to Korean Application No. 10-2013-0115216, filed Sep. 27, 2013, Korean Application No. 10-2013-0117044, filed Sep. 30, 2013, and Korean Application No. 10-2014-0129888, filed Sep. 29, 2014, all of which are incorporated herein by reference in their entirety for all purposes as if fully set forth herein.

FIELD

The present application relates to an optical film, an optical laminate, and a display device.

BACKGROUND

Films which exhibit optical anisotropy are used for various purposes.

These films may be used for purposes such as, for example, adjusting optical properties of a liquid crystal display (LCD), improving light utilization efficiency, or ensuring anti-reflectivity and visibility in an organic light emitting device (OLED). Further, the films as described above may be used to generate a stereoscopic image, or to improve quality of the stereoscopic image.

PRIOR ART DOCUMENT

Patent Document 1: Japanese Patent Publication No.: 1996-321381

Description

Object

The present application is directed to providing an optical film, an optical laminate and a display device. In the present application, one primary objective is to provide an optical film having so-called reverse-wavelength dispersion while being a single layer, due to an arrangement form of a liquid crystal compound in a liquid crystal layer included in the optical film being adjusted.

Solution

According to an aspect of the present application, there is provided an optical film. An illustrative optical film may include a liquid crystal layer. The liquid crystal layer includes a twisted nematic liquid crystal compound, and the liquid crystal compound may be polymerized in an aligned state as described above and form the liquid crystal layer. Hereinafter, in the present application, the twisted nematic liquid crystal compound may be abbreviated to TN, and the liquid crystal layer including the TN may be called a TN layer.

In terms of the TN having a helical structure in which an optical axis of the nematic liquid crystal compound is twisted along a virtual helical axis to form a layer and align, the TN is similar to a so-called cholesteric liquid crystal (CLC) layer, but they are different in that a twist angle of the liquid crystal compound is less than 360 degrees. In the above description, the term "optical axis of the liquid crystal compound" may refer to a direction of the liquid crystal compound. Due to the difference of the TN from the CLC, a thickness of the TN layer is less than a pitch. In the above description, the term "pitch" refers to a distance required for the TN to complete a 360-degree revolution.

In order to describe an alignment form of the TN, first, an alignment form of the CLC will be described in conjunction with FIG. 1.

Referring to FIG. 1, the CLC has a helical structure, in which an optical axis direction of the liquid crystal compound (n in FIG. 1) is twisted along a helical axis (X in FIG. 1) to form a layer and align. In the above description, the helical axis is a virtual line determined according to the CLC. In the CLC structure, the distance to complete a 360-degree revolution by the optical axis of the liquid crystal compound (P in FIG. 1) is called a "pitch."

The alignment form of the TN is similar to that of the CLC, but a thickness of the liquid crystal layer is less than the pitch (P in FIG. 1), and thus a rotation angle of the liquid crystal compound is less than 360 degrees.

A twist angle of the TN in the TN layer may be in a range of 50 to 300 degrees. In an embodiment of the present application, the term "twist angle of TN" refers to an angle between the optical axis of the liquid crystal compound present in the lowermost part of the TN layer and the optical axis of the liquid crystal compound present in the uppermost part of the TN layer. The term "lower part or upper part of the TN layer" used herein is a concept to define a relative positional relationship. That is, when any one surface of the TN layer is assumed to be the lower part, the opposite surface thereof is defined as the upper part, and here, the surface defined as the lower part may not necessarily be located at the lower part upon application of the TN layer. In another embodiment, the twist angle may be 60 degrees or more, 70 degrees or more, or 75 degrees or more. In still another embodiment, the twist angle may be 290 degrees or less, 280 degrees or less, 270 degrees or less, 260 degrees or less, 250 degrees or less, 240 degrees or less, 230 degrees or less, 220 degrees or less, 210 degrees or less, 200 degrees or less, 190 degrees or less, 180 degrees or less, 170 degrees or less, 160 degrees or less, 150 degrees or less, 140 degrees or less, 130 degrees or less, 120 degrees or 110 degrees or less.

The twist angle may be properly modified to be suitable for application of use of the optical film.

In the embodiment of the present application, an alignment of the TN layer may be further adjusted in order to ensure a desired effect. That is, a rotation angle of the liquid crystal compound rotating along the helical axis in the TN layer, in other words, a change of an angle between the optical axis of the liquid crystal compound at the lowermost part of the TN layer and the optical axis of the liquid crystal compound according to a thickness, may be non-linear. An objective that will be described below, in other words, the liquid crystal layer having the so-called reverse-wavelength dispersion, may be formed by the alignment as described above.

For example, a graph in which an x-axis is a thickness change in a direction from the lower part to the upper part of the TN layer, and a y-axis is an angle between the optical axis direction of the liquid crystal compound present in the corresponding thickness and the optical axis direction of the liquid crystal compound present in the lowermost part of the TN layer may be a nonlinear graph. Referring to FIG. 2A, when the graph is linear (201, FIG. 2A), that is, when a rotation angle of the liquid crystal compound constantly changes, a desired effect may not be easily ensured. Alternatively, when the graph is non-linear (e.g., 202, FIG. 2A, and FIG. 2B), that is, when a rotation angle of the liquid crystal compound variably changes, a desired effect may be ensured. The TN layer having the non-linear graph as described above may be produced by controlling a twisting power of the nematic liquid crystal compound to be different according to a thickness in a producing process, which may be performed by adjusting a concentration of the chiral agent as will be described below.

In order to achieve desired physical properties, the graph of the TN layer in the embodiment of the present application may be expressed as a nonlinear graph including a part in which a slope of the graph also increases as the thickness of the liquid crystal layer increases (i.e., as values of an x-axis increase).

The TN layer in the embodiment of the present application shows the so-called reverse-wavelength dispersion according to a specific alignment as described above. In the embodiment of the present application, the reverse-wavelength dispersion may mean a state satisfying the following Expression 1.

$$R(650)/R(550) > R(550)/R(550) > R(450)/R(550) \quad \text{[Expression 1]}$$

In Expression 1, R(650) is an in-plane retardation of the liquid crystal layer with respect to light with a wavelength of 650 nm, R(550) is an in-plane retardation of the liquid crystal layer with respect to light with a wavelength of 550 nm, and R(450) is an in-plane retardation of the liquid crystal layer with respect to light with a wavelength of 450 nm.

In the above description, the in-plane retardation with respect to each wavelength may be determined by the following Expression 2.

$$R(\lambda) = d \times (Nx - Ny) \quad \text{[Expression 2]}$$

In Expression 2, $R(\lambda)$ is an in-plane retardation of a TN layer with respect to light with a wavelength of $\lambda$ nm, d is a thickness of the TN layer, Nx is a refractive index with respect to light with a wavelength of $\lambda$ nm in a slow-axis direction, in other words, in a direction showing the highest refractive index in a plane, and Ny is a refractive index with respect to light with a wavelength of $\lambda$ nm in a fast-axis direction, in other words, in a direction perpendicular to the slow axis in a plane.

In Expression 1, a specific range of R(450)/R(550) and R(650)/R(550) is not particularly limited. In the embodiment, in Expression 1, R(450)/R(550) may be in a range of 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91. Further, R(650)/R(550) may be in a range of 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11. In this range, the desired reverse-wavelength dispersion may be properly ensured.

A TN layer of the optical film may have ¼ or ½ wavelength phase retardation. In the present application, the term "n wavelength phase retardation" may refer to properties capable of retarding incident light n times the wavelength of the incident light in at least a portion of a wavelength. When a TN layer has the ¼ wavelength phase retardation, the in-plane retardation of the TN layer with respect to light with a wavelength of 550 nm may be in a range of 110 to 220 nm, or 140 to 170 nm. Further, when a TN layer has the ½ wavelength phase retardation, the in-plane retardation of the TN layer with respect to light with a wavelength of 550 nm may be in a range of 240 to 350 nm, or 250 to 340 nm.

In an illustrative optical film, the helical axis of the TN layer may be formed parallel to a thickness direction of the TN layer. The term "thickness direction of the TN layer" may refer to a direction parallel to a virtual line which connects the lowermost part and the uppermost part of the TN layer by the shortest distance. In the embodiment, when the optical film additionally includes a base material layer as will be described below, and the TN layer is formed on one surface of the base material layer, a thickness direction of the TN layer may be a direction parallel to a virtual line which is formed in a direction perpendicular to the surface of the base material layer on which the TN layer is formed. Further, in the present application, when an angle is defined using terms such as "perpendicular," "parallel," "orthogonal," "horizontal," or the like, these mean substantially "perpendicular," "parallel," "orthogonal," or "horizontal" within a range not impairing a desired effect. For example, these include an error in which a manufacturing error, a variation, or the like is considered. For example, in individual cases, an error within about ±15 degrees, an error within about ±10 degrees, or an error within about ±5 degrees may be included.

The TN layer may have, for example, a thickness in a range of 0.1 to 10 μm. Other lower limits of the thickness may be 0.5 μm, 1 μm, or 1.5 μm, and other upper limits of the thickness may be 9 μm, 8 μm, 7 μm, 6 μm, 5 μm, or 4 μm. When a thickness of the TN layer is controlled to be in the above range, the retardation distribution may be optically adjusted.

In the embodiment, the TN layer may include a liquid crystal polymer. In an illustrative method of producing the TN layer, a composition including a polymeric liquid crystal compound and a chiral agent which is polymeric or non-polymeric is coated, and the composition is polymerized while a revolution of the liquid crystal compound is induced from the chiral agent, thereby forming the TN layer. Here, the TN layer may include a polymerized liquid crystal polymer.

An illustrative TN layer may include compounds represented by the following Formula 1 in a polymerized form.

[Formula 1]

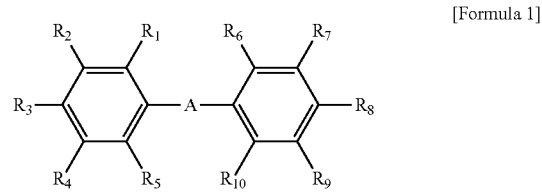

In Formula 1, A is a single bond, —COO—, or —OCO—, and $R_1$ to $R_{10}$ are independently hydrogen, a halogen, an alkyl group, an alkoxy group, a cyano group, a nitro group, —O-Q-P, or a substituent of the following Formula 2, respectively, and at least one of $R_1$ to $R_{10}$ is —O-Q-P or a substituent of the following Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group

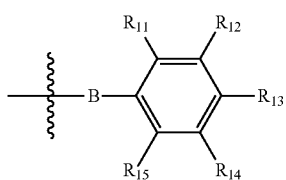

[Formula 2]

In Formula 2, B is a single bond, —COO—, or —OCO—, and $R_{11}$ to $R_{15}$ are each independently hydrogen, a halogen, an alkyl group, an alkoxy group, a cyano group, a nitro group, or —O-Q-P, and at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

"—" on the left side of B in Formula 2 means that B directly binds to benzene of Formula 1.

The term "single bond" in Formula 1 and Formula 2 means that there is no special atom at the part marked A or B. For example, when A of Formula 1 is a single bond, benzenes on both sides of A may be directly bound to form a biphenyl structure.

In Formula 1 and Formula 2, examples of the halogen may include chlorine, bromine, iodine, etc.

In Formula 1 and Formula 2, examples of the alkyl group may include a straight or branched chain alkyl group having a carbon number from 1 to 20, a carbon number from 1 to 16, a carbon number from 1 to 12, a carbon number from 1 to 8, or a carbon number from 1 to 4 or a cycloalkyl group having a carbon number from 3 to 20, a carbon number from 3 to 16 or a carbon number from 4 to 12. Further, the alkyl group may be arbitrarily substituted with at least one substituent.

In Formula 1 and Formula 2, examples of the alkoxy group may include an alkoxy group having a carbon number from 1 to 20, a carbon number from 1 to 16, a carbon number from 1 to 12, a carbon number from 1 to 8 or a carbon number from 1 to 4. The alkoxy group may have a straight chain, branched chain, or circular structure. Further, the alkoxy group may be arbitrarily substituted with at least one substituent.

In Formula 1 and Formula 2, examples of the alkylene group or alkylidene group may include an alkylene group or alkylidene group having a carbon number from 1 to 12, a carbon number from 4 to 10 or a carbon number from 6 to 9. The alkylene group or alkylidene group may have a straight chain, branched chain, or circular structure. Further, the alkylene group or alkylidene group may be arbitrarily substituted with at least one substituent.

In Formula 1 and Formula 2, examples of the alkenyl group may include an alkenyl group having a carbon number from 2 to 20, a carbon number from 2 to 16, a carbon number from 2 to 12, a carbon number from 2 to 8 or a carbon number from 2 to 4. The alkenyl group may have a straight chain, branched chain, or circular structure. Further, the alkenyl group may be arbitrarily substituted with at least one substituent.

Examples of the substituent for the alkyl group, the alkoxy group, the alkenyl group, the alkylene group, or the alkylidene group may include an alkyl group, an alkoxy group, an alkenyl group, an epoxy group, a cyano group, a carboxyl group, an acryloyl group, a methacryloyl group, an acryloyloxy group, a methacryloyloxy group, an aryl group, or the like, but are not limited thereto.

In Formula 1 and Formula 2, P may be an acryloyl group, a methacryloyl group, an acryloyloxy group, or a methacryloyloxy group, and in another embodiment, P may be an acryloyloxy group.

In Formula 1 and Formula 2, —O-Q-P or a residue of Formula 2, of which at least one may be present, may be present at the site of R3, R8, or R13, and for example, may be one or two. Further, a substituent other than —O-Q-P or a residue of Formula 2 in a compound of Formula 1 or the residue of Formula 2 may be, for example, hydrogen, a halogen, a straight chain or branched chain alkyl group having a carbon number from 1 to 4, a cycloalkyl group having a carbon number from 4 to 12, a cyano group, an alkoxy group having a carbon number from 4 to 12, a cyano group, or a nitro group, and preferably, chlorine, a straight chain or branched chain alkyl group having a carbon number from 1 to 4, a cycloalkyl group having a carbon number from 4 to 12, an alkoxy group having a carbon number from 1 to 4, or a cyano group.

When the chiral agent that may be included in the liquid crystal layer does not damage nematic regularity, and induces a desired helical pitch, it may be used without particular limitation. The chiral agent for inducing the helical pitch in the liquid crystal is required to include at least chirality in the molecular structure. Examples of the chiral agent may include a compound having one or two or more asymmetric carbons, a compound with an asymmetric point on a hetero atom, such as, chiral amine, chiral sulfoxide, or the like, or a compound with an axially asymmetric, optically active site having axial asymmetry, such as cumulene, binaphthol, or the like. For example, the chiral agent may be a low molecular compound having a molecular weight of 1,500 or less. As the chiral agent, a commercial chiral nematic liquid crystal, for example, Chiral Dopant Liquid Crystal S-811 available from Merck & Co., Inc., LC756 available from BASF SE, and the like may be used.

In the embodiment, the optical film may further include a base material layer, and the TN layer may be formed on one surface of the TN base layer.

As the base material layer, a transparent base material layer such as a glass base material layer, transparent plastic base material layer, or the like may be used. Examples of the plastic base material layer may include a cellulose base material layer such as a diacetyl cellulose (DAC) or triacetyl cellulose (TAC) base material layer; a cyclo olefin copolymer (COP) base material layer such as a norbornene derivative resin base material layer, or the like; an acrylic base material layer such as a poly(methyl methacrylate) (PMMA) base material layer, or the like; a polycarbonate (PC) base material layer; an olefin base material layer such as a polyethylene (PE) or polypropylene (PP) base material layer, or the like; a polyvinyl alcohol (PVA) base material layer; a poly ether sulfone (PES) base material layer; a polyetheretherketone (PEEK) base material layer; a polyetherimide (PEI) base material layer; a polyethylenenaphthalate (PEN) base material layer; a polyester base material layer such as a polyethyleneterephthalate (PET) base material layer, or the like; a polyimide (PI) base material layer; a polysulfone (PSF) base material layer; a polyarylate (PAR) base material layer or a fluoric resin base material layer, etc. The base material layer may be, for example, in a sheet or film shape.

The base material layer may be subjected to various surface treatments, such as a low reflection treatment, an anti-reflection treatment, an anti-glare treatment, a high-resolution anti-glare treatment, or the like, as necessary.

The optical film may also further include an alignment layer. The term "alignment layer" may refer to a layer for providing or improving alignment uniformity in the process of forming the liquid crystal layer, or exhibiting a surface alignment property to align the director of the liquid crystal. The alignment layer may be, for example, a resin layer for providing a plurality of patterned groove areas, a photo alignment layer, a rubbing layer, such as rubbed polyimide, and the like. For example, when the optical film 100 includes the base material layer 101 as shown in FIG. 4, the alignment layer 102 may be formed at a surface of the base material layer 101, for example, between the base material layer 101 and the TN layer 103. In some cases, without forming a separate alignment layer, a method of providing an alignment property to the base material layer may also be used by simply rubbing or stretching the base material layer or providing a hydrophilic property to the surface of the base material layer. For example, when the base material layer has a wetting angle within the above range, the base material layer may have the property for controlling a TN alignment within a desired range even without the alignment layer.

According to another aspect of the present application, there is provided a method of producing the optical film as described above. The producing method may include, for example, inducing a change in concentration according to a thickness of a coating layer of the chiral agent with respect to a liquid crystal coating layer including a nematic liquid crystal compound, a chiral agent, and a polymerization initiator; and polymerizing the nematic liquid crystal compound while the concentration change of the chiral agent is induced.

The liquid crystal coating layer may be formed by coating a coating solution (TN composition) including the nematic liquid crystal compound, for example, a compound of Formula 1, a chiral agent, and a polymerization initiator.

The TN composition may be a part of a coating composition typically including at least one solvent. The coating composition may include, for example, a dispersing agent, an antioxidant, an antiozonant, etc. Additionally, the coating composition may include various dyes and pigments in order to absorb ultraviolet rays, infrared rays, or visible rays, as required. In certain cases, a viscosity modifier, such as a thickener or filler, may be properly added.

The TN composition may be applied by all kinds of liquid-coating methods.

In some embodiments, after coating, the TN composition is polymerized, or converted to a TN layer. The conversion may be achieved by evaporating the solvent and heating to align the TN material; crosslinking the TN composition; or, for example, applying heat such as actinic irradiation; radiating light, such as ultraviolet rays, visible rays, or infrared rays, and radiating electron beams, or combinations thereof, or various techniques including curing of the TN composition by use of similar techniques.

In the embodiment, the TN composition may include the compound of Formula 1, a polymerization initiator, and a chiral agent.

As the polymerization initiator, for example, a radical initiator generating radicals by heat or light may be used. The radical initiator initiates polymerization or crosslinking of the nematic liquid crystal compound, and may be used by properly selecting a general component well known in the related art as long as it has no compatibility problems with the compounds. As the radical initiator, for example, one type or at least two types selected from 2-methyl-1-[4-(methylthio)phenyl]-2-(4-morpholinyl)-1-propanone, 2-dimethoxy-1,2-diphenylethan-1-one, 1-hydroxy-cyclohexyl-phenyl-ketone, triaryl sulfonium hexafluoroantimonate salts, diphenyl(2,4,6-trimethylbenzoyl)-phosphine oxide, and the like may be used, but the radical initiator is not limited thereto. The TN composition may include the radical initiator in a ratio of 0.1 to 10 parts by weight with respect to 100 parts by weight of the liquid crystal compound. The polymerization and crosslinking of the liquid crystal compound may be effectively induced and degradation of physical properties due to the remaining initiator after the polymerization and crosslinking may be prevented by controlling content of the radical initiator as described above. In the present application, unless otherwise defined, the unit "parts by weight" may refer to the weight ratio of each component.

As the chiral agent, for example, the above-described types of compounds may be used. TN composition may include the chiral agent in a ratio of 0.1 to 10 parts by weight with respect to 100 parts by weight of the liquid crystal compound. A concentration gradient of the chiral agent and polymerization of the liquid crystal compound may be effectively induced by controlling content of the chiral agent as described above.

The TN composition may further include a solvent as necessary. Examples of the solvent may include, for example, halogenated hydrocarbons, such as chloroform, dichloromethane, tetrachloroethane, trichloroethylene, tetrachloroethylene, chlorobenzene, and the like; aromatic hydrocarbons, such as benzene, toluene, xylene, methoxy benzene, 1,2-dimethoxybenzene, and the like; alcohols, such as methanol, ethanol, propanol, isopropanol, acetone, methylethylketone, methylisobutylketone, cyclohexanone, cyclopentanone, and the like; cellosolves, such as methylcellosolve, ethylcellosolve, butylcellosolve, and the like; ethers, such as diethylglycol dimethylether (DEGDME), dipropyleneglycol dimethylether (DPGDME), and the like; etc. Further, content of the solvent is not particularly limited, and may be properly selected in consideration of coating efficiency, drying efficiency, etc.

Further, the TN composition may further include a surfactant. The surfactant is distributed on the surface of the liquid crystal to allow the surface to be even, and also may stabilize the alignment of liquid crystal, thereby maintaining a smooth surface of the film after forming the TN layer, and as a result, the quality of the appearance may be improved.

Examples of the surfactant may include a fluorocarbon-based surfactant and/or silicon-based surfactant. The fluorocarbon-based surfactant may include Fluorad FC4430#, Fluorad FC4432#, and Fluorad FC4434# that are available from 3M Company, Zonyl available from E.I. du Pont de Nemours and Company, and the like may be used. As the silicon-based surfactant, BYK™ available from BYK-Chemie GmbH, and the like may be used. Content of the surfactant is not particularly limited, but may be properly selected in consideration of coating efficiency, drying efficiency, etc.

After applying the above-described TN composition and forming the liquid crystal coating layer, for example, the TN layer may be formed by polymerizing the liquid crystal compound while a concentration gradient of the chiral agent is induced.

In the embodiment, the formation of the TN layer may include forming a concentration gradient of the chiral agent by irradiating the TN composition-applied layer with relatively weak ultraviolet rays, and then irradiating the applied layer formed with the concentration gradient with relatively strong ultraviolet rays to polymerize the components of the composition.

When irradiating the TN composition-applied layer with relatively weak ultraviolet rays at a predetermined temperature, the concentration gradient of the chiral agent within the applied layer, that is, a change in concentration of the chiral agent, may be induced along a predetermined direction within the applied layer. In the embodiment, the concentration gradient of the chiral agent may be formed along a thickness direction of the applied layer. The irradiation of ultraviolet rays to form the concentration gradient of the chiral agent may be performed, for example, at a temperature in a range of 40 to 80° C., 50 to 70° C. or about 60° C. Further, the irradiation with ultraviolet rays for the formation of the concentration gradient may be performed by irradiating with the ultraviolet rays at a wavelength of UV A at an intensity of radiation in a range of about 10 $mJ/cm^2$ to 500 $mJ/cm^2$. In order to form the concentration gradient more effectively, the intensity of radiation may be adjusted to be in a range of about 50 to 400 $mJ/cm^2$, about 50 to 300 $mJ/cm^2$, about 50 to 200 $mJ/cm^2$, about 50 to 150 $mJ/cm^2$, or about 75 to 125 $mJ/cm^2$.

After forming the concentration gradient, the TN layer may be formed by irradiating with sufficient ultraviolet rays to polymerize the components of the composition. Through the irradiation with ultraviolet rays, the liquid crystal may be fixed to have a different pitch according to the concentration gradient of the chiral agent which is formed in the applied layer, and thereby the TN area may be formed. A condition of the strong ultraviolet rays is not particularly limited as long as the polymerization of the components of the composition is sufficiently performed. In the embodiment, the irradiation of ultraviolet rays may be performed by irradiating at an intensity of radiation of about 0.5 $J/cm^2$ to 10 $J/cm^2$. Here, the wavelength of the ultraviolet rays for irradiation is not particularly limited as long as the polymerization of the components of the composition is sufficiently performed, for example, light with a wavelength of UV A to V may be radiated.

In the embodiment, the TN composition-applied layer may be formed on a proper base material layer.

In the embodiment, the TN composition-applied layer may be formed on an alignment layer formed on the base material layer.

The alignment layer may be formed, for example, using a method of forming a polymer layer such as a polyimide layer, or the like and rubbing, coating photo-alignment compounds and then alignment-processing through irradiation of linearly polarized light, or an imprinting method such as a nano imprinting method, or the like.

The optical film including the TN layer as described above may be applied to various uses by itself or in combination with another component.

According to another aspect of the present application, there is provided an optical laminate including the optical film and another component.

The above-described optical laminate, for example, may be applied to an LCD, an OLED, or the like, or may be applied to implement a stereoscopic image or improve quality thereof.

In the embodiment, the optical laminate may include a retardation film as another component. As the retardation film, various components may be selected according to purpose without particular limitation. As the retardation film, for example, a plate which is well known as a so-called half wave plate (HWP), a quarter wave plate (QWP), or the like may be used. The retardation film may be a polymer film provided with retardation by stretching, or a liquid crystal film.

When the optical laminate includes the optical film and the retardation film, the optical axis of the liquid crystal of the TN layer of the optical film and a slow axis of the retardation film may be variously set according to purpose of application.

For example, in the laminate, an angle between the slow axis of the retardation film and the optical axis of the nematic liquid crystal compound positioned most adjacent to the retardation film may be in a range of about 5 to 90 degrees, or about 10 to 70 degrees.

In the embodiment, the optical laminate may further include a polarizing layer.

The above-described optical laminate, for example, may sequentially include a polarizing layer 401, a retardation film 402, and an optical film 403 as shown in FIG. 4.

In the structure as described above, an angle between a light absorbance axis of the polarizing layer 401 and a slow axis of the retardation film 402 may be in a range of 10 to 20 degrees. Further, an angle between the slow axis of the retardation film 402 and the optical axis of the nematic liquid crystal compound positioned most adjacent to the retardation film on the TN layer of the optical film 403 may be in a range of 8 to 16 degrees. In the structure as described above, a twist angle of the TN layer may be in a range of 36 to 50 degrees. The optical laminate having the above-described structure may be applied to various uses, for example, may be used as an anti-reflection polarizing plate, etc.

In another embodiment, the optical laminate may include a polarizing layer 401, the optical film 403, and the retardation film 402 which are sequentially arranged as shown in FIG. 5.

In the above-described relationship, the light absorbance axis of the polarizing layer 401 and the slow axis of the retardation film 402 may be perpendicular or parallel to each other.

In the above description, when the slow axis of the retardation film 402 and the light absorbance axis of the polarizing layer 401 are perpendicular to each other, an angle between the optical axis of the liquid crystal compound most adjacent to the retardation film on the TN layer of the optical film 403 and the slow axis of the retardation film 402 may be in a range of about 50 to 70 degrees, or about 55 to 67 degrees. Further, in the above-described case, a twist angle of the TN layer may be in a range of about 10 to 30 degrees.

Further, in the above description, when the slow axis of the retardation film 402 and the light absorbance axis of the polarizing layer 401 are parallel to each other, an angle between the optical axis of the liquid crystal compound most adjacent to the retardation film on the TN layer of the optical film 403 and the slow axis of the retardation film 402 may be in a range of about 15 to 35 degrees, or about 17 to 32 degrees. Further, in the above-described case, a twist angle of the TN layer may be in a range of about 60 to 85 degrees. The optical laminate with the above-described structure may be applied to various uses, for example, may be used as an anti-reflection polarizing plate of an OLED, etc.

In another embodiment, the optical laminate may include a polarizing layer as another component. In this case, an absorptive polarizing layer or reflective polarizing layer may be applied as the polarizing layer. Types of the absorptive polarizing layers or reflective polarizing layers which may be used in the above case are not particularly limited. Examples of the absorptive polarizing layer may include a well-known polarizing layer of a polyvinyl alcohol (PVA) film type, and examples of the reflective polarizing layer may include the polarizing layer produced with a lyotrophic liquid crystal (LLC) or cholesteric liquid crystal (CLC), or a film well known as a so-called dual brightness enhancement film (DBEF) or wire grid polarizer (WGP).

FIG. 6 is a cross-sectional view of an illustrative optical laminate, showing a case in which the optical laminate includes a polarizing layer 601 and an optical film 602 arranged on one surface of the polarizing layer 601. In the above description, the polarizing layer 601 may be the absorptive polarizing layer or reflective polarizing layer as described above.

In the above-described case in which the optical laminate includes the polarizing layer, in the optical film, an angle between the optical axis of the liquid crystal compound most adjacent to the polarizing layer in the TN layer and the light absorbance axis or light reflection axis of the polarizing layer may be in a range of 5 to 15 degrees, or in a range of 95 to 105 degrees. Further, in the above description, a twist angle of the TN layer may be in a range of 80 to 100 degrees.

In another embodiment, the optical laminate may include both an absorptive polarizing layer and reflective polarizing layer. FIG. 7 illustrates an illustrative structure of the optical laminate, showing a case in which an absorptive polarizing layer 6011, a reflective polarizing layer 6022, and the optical film 602 are sequentially arranged. Unlike the structure shown in FIG. 7, the absorptive polarizing layer 6011 may be positioned closer to the optical film 602 than the reflective polarizing layer 6022.

In the above-described case, the light absorbance axis of the absorptive polarizing layer and a light reflection axis of the reflective polarizing plate may be parallel to each other. In this case, an angle between the optical axis of the liquid crystal compound most adjacent to the absorptive polarizing layer or reflective polarizing layer in the TN layer and the light absorbance axis or light reflection axis of the polarizing layer may be in a range of 5 to 15 degrees, or in a range of 95 to 105 degrees. Further, in the above description, a twist angle of the TN layer may be in a range of 80 to 100 degrees.

The optical laminate with the structure described above, for example, may be used as an anti-reflection film in an OLED or reflective LCD, or as a brightness improving film in an LCD.

The above-described optical laminate may be produced by laminating the optical film of an embodiment of the present application, and the polarizing layer or retardation film using a pressure-sensitive adhesive or an adhesive, or by directly coating the above-described TN composition on the polarizing layer or retardation film to form a coating layer, and then polymerizing the coating layer.

According to another aspect of the present application, there is provided a display device. An illustrative display device may include the optical film or optical laminate.

Specific types of the display device including the optical laminate are not particularly limited. The device may be, for example, an LCD, an OLED, etc.

An arrangement form of the optical film or optical laminate in the display device is not particularly limited, and for example, a well-known form may be used. For example, in the device, when the optical film or optical laminate changes light properties, or is applied for an anti-reflection effect, the optical film or optical laminate may be positioned adjacent to a front side of the display device or a reflection electrode layer of an OLED. Further, when the optical film or optical laminate is applied as a brightness improving film in an LCD or the like, the optical film or optical laminate may be positioned between a display panel and light source.

Effect

In the embodiment of the present application, control of the alignment state of the liquid crystal compound in the liquid crystal layer can allow the liquid crystal layer to exhibit the so-called reverse-wavelength dispersion even while forming a thin single layer. The optical film including the above-described liquid crystal layer may exhibit optical modulation in the display device such as the LCD, OLED, or the like, or may be used for various purposes such as an optical element capable of improving light utilization efficiency or an element for an implementation of stereoscopic images and quality improvement thereof.

BRIEF DESCRIPTION OF THE DRAWINGS

FIG. 1 is a conceptual diagram for describing an alignment of a liquid crystal compound.

EXPLANATION OF THE MARKS IN THE DRAWINGS

Figure 2A:
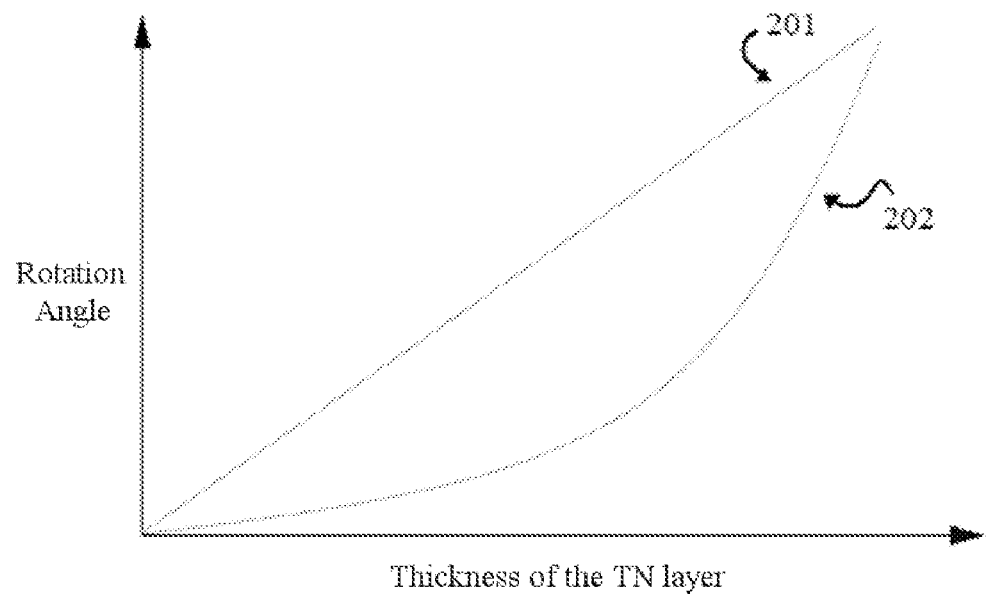
FIG. 2A is a conceptual graph for describing an alignment of the liquid crystal compound.

101: the base material layer
102: the alignment layer
103: the TN layer
201: the linear graph
202: the non-linear graph
401, 601: the polarizing layer
402: the retardation film
403, 602: the optical film
6011: the absorptive polarizing layer
6022: the reflective polarizing layer

DETAILED DESCRIPTION OF ILLUSTRATIVE EMBODIMENTS

Hereinafter, an optical film will be described in detail in conjunction with examples and comparative examples, but the scope of the film is not limited to the following examples.

PREPARATION EXAMPLE

Preparation of Liquid Crystal Compositions

Liquid crystal compositions were prepared by the following method. RM1230 (compositions including a chiral dopant) and RM1231 (compositions not including a chiral dopant), which are reactive mesogens (RMs) available from Merck & Co., Inc. that are well known for use in preparation of a cholesteric liquid crystal (CLC) were mixed in a ratio of 1:1, and then mixed with a mixing solvent of toluene and cyclohexanone (mixing weight ratio=7:3 (toluene:cyclohexanone)) to form about 40 wt % of solid fractions. Subsequently, a photo-polymerization initiator (Irgacure 907) having a maximum absorption wavelength in a range of 280 to 320 nm as a radical initiator was mixed at 3 wt % with respect to the solid fractions of RMs, and a photo-polymerization initiator (Darocure TPO) having a maximum absorption wavelength in a range of 360 to 400 nm was also mixed at 0.4 wt % with respect to the solid fractions of RMs. Thereafter, the mixed solution was heated at a temperature of about 60° C. for 1 hour, and then sufficiently cooled down to prepare a homogeneous solution.

EXAMPLE 1

After a well-known rubbing alignment layer was formed on one surface of a poly(ethylene terephthalate) (PET) film, the alignment layer was coated with the prepared compositions using a wire bar No. 6, and then dried at 100° C. for about two minutes. Then, a concentration gradient of a chiral agent was induced by irradiating the coating layer with ultraviolet rays having a wavelength in a range of 350 to 400 nm using an ultraviolet irradiation device (TLK40W/10R; available from Royal Philips Electronics N.V.) at a temperature of about 60° C. (intensity of irradiation: about 100 mJ/cm$^2$). Thereafter, the coating layer on which the concentration gradient was induced was irradiated with the strong ultraviolet rays at an intensity of 1 mJ/cm$^2$ or more using the ultraviolet irradiation device (Fusion UV, 400 W) to sufficiently polymerize RMs to form a TN layer having a thickness of about 3 µm. In the result of the determination using an optical polarizing microscope (available from Leica Microsystems Ltd.), a twist angle of the TN layer was about 90 degrees, and showed non-linear properties as shown in 202 of FIG. 2A and in FIG. 2B.

COMPARATIVE EXAMPLE 1

Liquid crystal layers were formed in a same manner as in Example 1 except that the coating layer was irradiated with the strong ultraviolet rays at an intensity of 1 mJ/cm$^2$ or more using the ultraviolet irradiation device (Fusion UV, 400 W) to sufficiently polymerize RMs to form a TN layer having a thickness of about 3 µm, without a process of irradiating the coating layer with ultraviolet rays having a wavelength in a range of 350 to 400 nm at an intensity of about 100 mJ/cm$^2$ using an ultraviolet irradiation device (TLK40W/10R; available from Royal Philips Electronics N.V.) at a temperature of about 60° C. In the result of the determination using an optical polarizing microscope (available from Leica Microsystems Ltd.), a twist angle of the TN layer was about 90 degrees, and showed linear properties as shown in 201 of FIG. 2A, and in FIG. 2B.

Physical Property Evaluation

Figure 8:
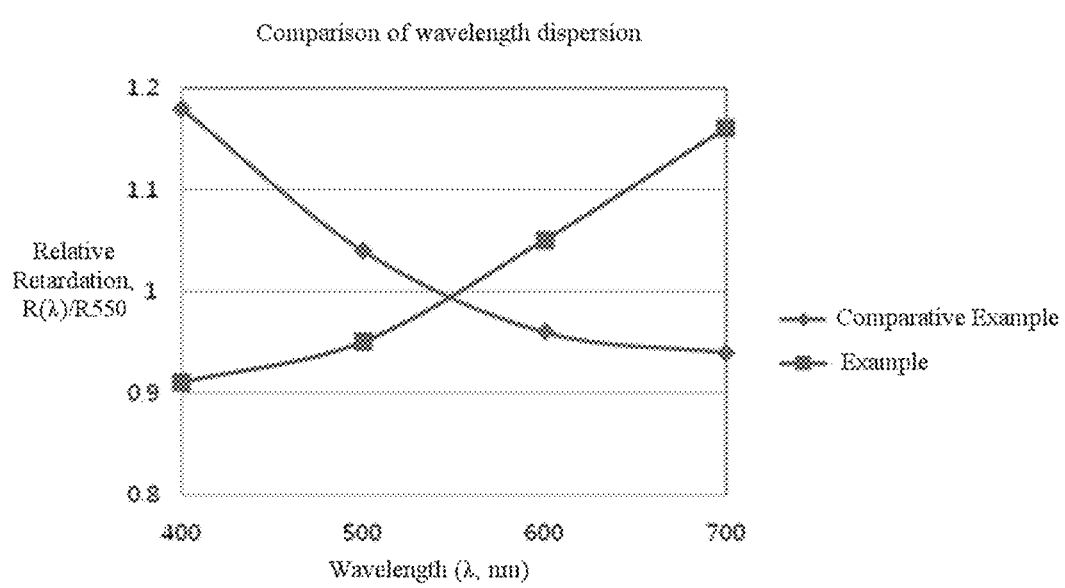
FIG. 8 is a view comparing a reverse-wavelength dispersion of examples and comparative examples.

Reverse-wavelength dispersion of liquid crystal films prepared in each of the examples and comparative examples was determined using an Axoscan (available from Axometrics, Inc.) device, and the results are specified in FIG. 8. As shown in FIG. 8, although the optical films of the examples and comparative examples have the same twist angles, the optical film of Example 1 showing a feature of a non-linear graph through an induced gradient of concentration may be determined to implement the so-called reverse-wavelength dispersion, and the optical film of Comparative Example 1 may be determined to implement a normal wavelength dispersion. In FIG. 8, the results of the examples are cases in which R(650)/R(550) is more than 1. Further, the optical film of Example 1 may be determined to be applied to various uses requiring a ¼ wavelength plate or ½ wavelength plate due to its reverse-wavelength dispersion and exhibit excellent properties.

What is claimed is:
1. An optical film comprising a twisted nematic (TN) liquid crystal layer, the TN liquid crystal layer comprising:
nematic liquid crystal compounds twisted along a virtual helical axis aligned in the TN liquid crystal layer and polymerized in a TN aligned state such that the helical axis is parallel to a thickness direction of the TN liquid crystal layer, and of the following Formula 1, and an angle between an optical axis of the nematic liquid crystal compounds present in the lowermost part of the TN layer and an optical axis of the nematic liquid crystal compounds present in the uppermost part of the TN layer is in a range from 50 to 300 degrees, and the layer does not include any cholesteric liquid crystal compounds having a twist angle of 360 degrees; and
a chiral agent forming a concentration gradient along a thickness direction of the liquid crystal layer, wherein a rotation angle of the liquid crystal compound variably changes in the thickness direction so that a change of an angle between the optical axis of the liquid crystal compound at the lowermost part of the TN liquid crystal layer and the optical axis of the liquid crystal compound according to a thickness is not constant,
wherein:
the liquid crystal layer exhibits a reverse-wavelength dispersion and satisfies the following Expression 1:
Expression 1
R(650)/R(550)>R(550)/R(550)>R(450)/R(550)
where R(650) is an in-plane retardation value of the TN liquid crystal layer with respect to light with a wavelength of 650 nm, R(550) is an in-plane retardation value of the TN liquid crystal layer with respect to light with a wavelength of 550 nm, and R(450) is an in-plane retardation value of the TN liquid crystal layer with respect to light with a wavelength of 450 nm,

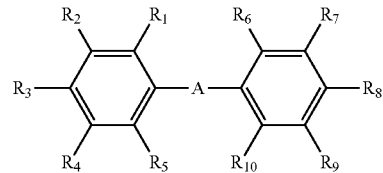
Formula 1 wherein in Formula 1, A is a single bond, —COO—, or —OCO—, and $R_1$ to $R_{10}$ are independently hydrogen, a halogen, an alkyl group, an alkoxy group, a cyano group, a nitro group, —O-Q-P, or a substituent of the following Formula 2, respectively, and at least one of $R_1$ to $R_{10}$ is —O-Q-P or a substituent of the following Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group,

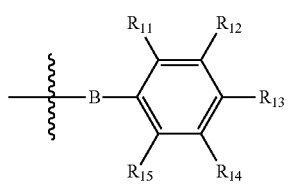

Formula 2 wherein in Formula 2, B is a single bond, —COO—, or —OCO—, and $R_{11}$ to $R_{15}$ are each independently hydrogen, a halogen, an alkyl group, an alkoxy group, a cyano group, a nitro group, or —O-Q-P, and at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

2. The optical film of claim 1, wherein the R(650)/R(550) is in a range from 1.01 to 1.19, and the R(450)/R(550) is in a range from 0.81 to 0.99.

3. The optical film of claim 1, wherein the in-plane retardation of the TN liquid crystal layer with respect to light with a wavelength of 550 nm is in a range of 110 to 220 nm, or in a range of 240 to 350 nm.

4. The optical film of claim 1, wherein the TN liquid crystal layer has a thickness in a range of 0.1 to 10 μm.

5. An optical laminate comprising a polarizing layer and the optical film of claim 1 arranged on one surface of the polarizing layer.

6. An optical laminate comprising:
the optical film of claim 1; and
a retardation film positioned at one side of the optical film.

7. The optical laminate of claim 6, wherein an angle between a slow axis of the retardation film and an optical axis of the nematic liquid crystal compound positioned most adjacent to the retardation film in the liquid crystal layer is in a range of 5 to 90 degrees.

8. The optical laminate of claim 6, further comprising a polarizing layer.

9. The optical laminate of claim 6, sequentially comprising the polarizing layer, the retardation film, and the optical film, wherein an angle between a light absorbance axis of the polarizing layer and a slow axis of the retardation film is in a range of 10 to 20 degrees, and an angle between a slow axis of the retardation film and an optical axis of the nematic liquid crystal compound positioned most adjacent to the retardation film in the liquid crystal layer of the optical film is in a range of 8 to 16 degrees.

10. The optical laminate of claim 9, wherein a twist angle of the liquid crystal layer is in a range of 36 to 50 degrees.

11. The optical laminate of claim 6, sequentially comprising the polarizing layer, the retardation film, and the optical film, wherein a slow axis of the retardation film and a light absorbance axis of the polarizing layer are perpendicular to each other, and an optical axis of the liquid crystal compound most adjacent to the retardation film in the liquid crystal layer of the optical film is in a range of 50 to 70 degrees.

12. The optical laminate of claim 11, wherein a twist angle of the liquid crystal layer is in a range of 10 to 30 degrees.

13. The optical laminate of claim 6, sequentially comprising the polarizing layer, the retardation film, and the optical film, wherein a slow axis of the retardation film and a light absorbance axis of the polarizing layer are parallel to each other, and an angle between an optical axis of the liquid crystal compound most adjacent to the retardation film in the liquid crystal layer of the optical film and a slow axis of the retardation film is in a range of 15 to 35 degrees.

14. The optical laminate of claim 13, wherein a twist angle of the liquid crystal layer is in a range of 60 to 85 degrees.

15. A method of producing the optical film of claim 1, comprising:
inducing a variable change in concentration according to a thickness of a coating layer of the chiral agent with respect to a liquid crystal coating layer comprising a nematic liquid crystal compound, a chiral agent, and a polymerization initiator; and
polymerizing the nematic liquid crystal compound while the change in concentration of the chiral agent is induced resulting in a non-linear change of angle between the optical axis of the liquid crystal compound at the lowermost part of the liquid crystal coating layer and the optical axis of the liquid crystal compound according to a thickness.

16. The method of producing the optical film of claim 15, wherein steps of inducing a change in concentration and polymerizing the liquid crystal compound comprise a process of irradiating a liquid crystal coating layer with ultraviolet rays of an ultraviolet ray A area at an intensity of radiation of 10 to 500 mJ/cm$^2$ at 40 to 80° C.; and a process of irradiating a liquid crystal coating layer having a change in concentration of the chiral agent with ultraviolet rays.

17. A display device comprising the optical film of claim 1.

Figure 2B:
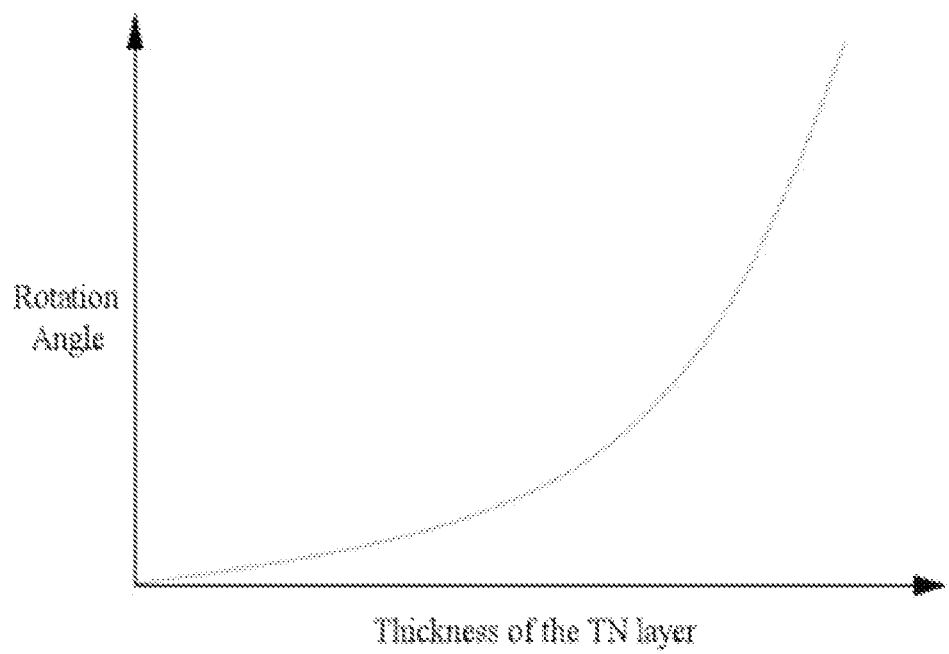
FIG. 2B is a graph showing a rotation angle of the liquid crystal compound that variably changes in a non-linear manner, where the x-axis is a thickness change in a direction from the lower part to the upper part of the TN layer, and the y-axis is an angle between an optical axis of the TN liquid crystal compound present in the corresponding thickness and an optical axis of the liquid crystal compound present in the lowermost part of the TN liquid crystal layer.
Figure 3:
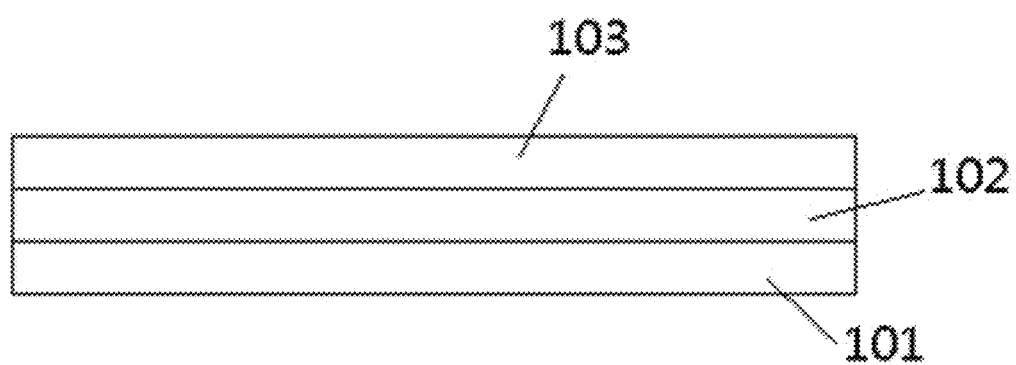
FIG. 3 is an illustrative cross-sectional view of an optical film.
Figure 4:
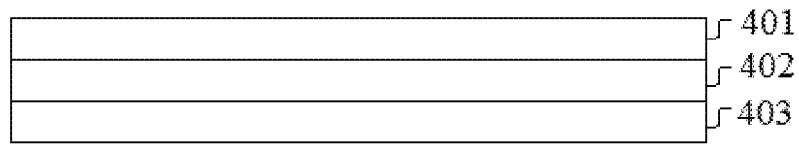
FIGS. 4 to 7 are views showing various structures of an optical laminate.
Figure 5:
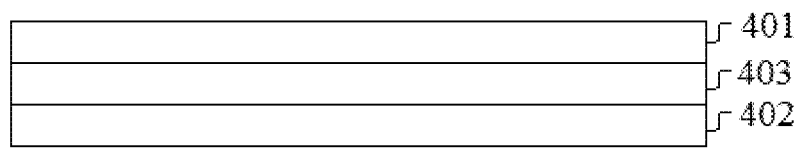
Figure 6:
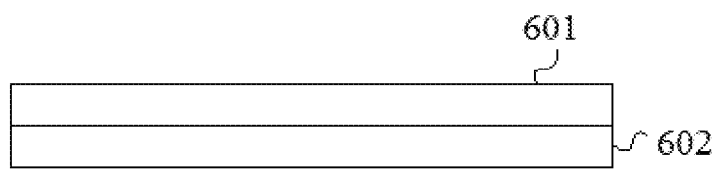
Figure 7:
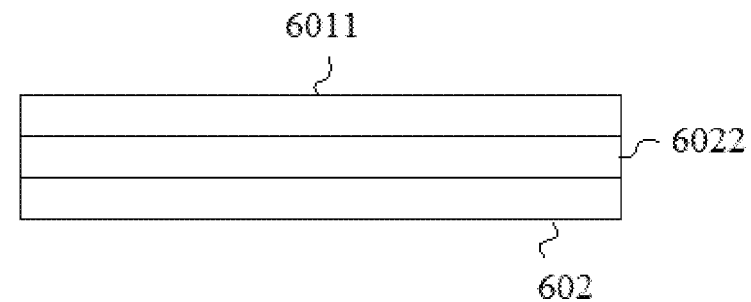

18. The optical film of claim 1, wherein a graph in which an x-axis is a thickness of the TN liquid crystal layer, and a y-axis is an angle between an optical axis of the TN liquid crystal compound present in the corresponding thickness and an optical axis of the liquid crystal compound present in the lowermost part of the TN liquid crystal layer (the position where the x is 0) is nonlinear as shown in FIG. 2B.

19. The optical film of claim 18, wherein the graph comprises a part in which a slope of the graph increases as the thickness of the TN liquid crystal layer increases.

\* \* \* \* \*